United States Patent
G et al.

(10) Patent No.: US 9,554,277 B2
(45) Date of Patent: Jan. 24, 2017

(54) MANAGING ACCESS RIGHTS USING A PASSIVE TAG

(71) Applicant: Honeywell International Inc., Morristown, NJ (US)

(72) Inventors: Vinayak G, Bangalore (IN); Anantha Padmanabha Rahul U, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 106 days.

(21) Appl. No.: 14/461,622

(22) Filed: Aug. 18, 2014

(65) Prior Publication Data
US 2016/0049030 A1   Feb. 18, 2016

(51) Int. Cl.
*H04W 12/08* (2009.01)
*H04W 4/00* (2009.01)
*G07C 9/00* (2006.01)

(52) U.S. Cl.
CPC .......... *H04W 12/08* (2013.01); *G07C 9/00571* (2013.01); *H04W 4/008* (2013.01); *G07C 9/00111* (2013.01)

(58) Field of Classification Search
None
See application file for complete search history.

(56) References Cited

U.S. PATENT DOCUMENTS

| | | |
|---|---|---|
| 5,768,379 A | 6/1998 | Girault et al. |
| 8,482,378 B2 | 7/2013 | Sadighi et al. |
| 2008/0071610 A1* | 3/2008 | Dhillon ................. G06Q 10/00 705/7.42 |
| 2011/0199255 A1 | 8/2011 | Murray et al. |
| 2012/0075057 A1* | 3/2012 | Fyke ................. G07C 9/00103 340/5.3 |
| 2012/0075059 A1 | 3/2012 | Fyke et al. |
| 2012/0221695 A1 | 8/2012 | Rose et al. |
| 2012/0274444 A1 | 11/2012 | Micali et al. |
| 2014/0266585 A1* | 9/2014 | Chao ................. G07C 9/00111 340/5.61 |
| 2015/0287318 A1* | 10/2015 | Nair ..................... G08C 17/02 340/5.52 |

OTHER PUBLICATIONS

"Secure offline access control with NFC", Telcred, http://www.telcred.com/howitworks.php, Date Accessed: Jul. 22, 2013, 6 pgs.
"PegaSys, Intelligent Access Control System", Ingersoll Rand, Brochure, 8 pgs., Copyright 2009.

(Continued)

*Primary Examiner* — Daniell L Negron
(74) *Attorney, Agent, or Firm* — Brooks, Cameron & Huebsch, PLLC

(57) ABSTRACT

Methods, devices, and systems for managing access rights are described herein. One method includes receiving, by a mobile device, information from a passive tag located at an entrance to an area, wherein the information includes identification information for the entrance, sending, by the mobile device to a computing device of an access control system associated with the area, the information from the passive tag and a request to access the area, and granting, by the computing device of the access control system, access to the area based on the information from the passive tag and the request to access the area.

17 Claims, 3 Drawing Sheets

(56) References Cited

OTHER PUBLICATIONS

"Electronic door handle XMP-CX2-000", aUTEC, Brochure, Mar. 2010, 2 pgs.
"SALTO Networked Locking System—scalable system", SALTO, http://www.saltosystems.com/index.php?option=com_content&task=v, 2 pgs., Date Accessed: Jul. 22, 2013.
"Enterprise Buildings Integrator R410, Specification and Technical Data", Honeywell International Inc., Brochure, Jun. 2013, 31 pgs.

* cited by examiner

MANAGING ACCESS RIGHTS USING A PASSIVE TAG

TECHNICAL FIELD

The present disclosure relates to methods, devices, and systems for managing access rights.

BACKGROUND

Access to a location, such as, for example, an area (e.g., room, zone, hallway, etc.) of a secured building or facility, may be controlled (e.g., limited and/or restricted) and/or monitored by an access control system. For example, the access control system may include an access control device (e.g., card reader, electronic lock, etc.) located at the entrance (e.g., door) to the area, and an individual (e.g., a worker, visitor, employee, etc.) attempting to enter the area may need to present a valid identification token (e.g., key card, magnetic badge, wireless identification tag, etc.) to the access control device in order to gain access to (e.g., enter) the area.

Such access control systems, however, may have a number of problems associated therewith. For example, if the individual is denied access to the area (e.g., if the access control device does not grant the individual access to the area upon the user presenting the identification token to the device), the individual may not know the reason for denial, especially if the individual believes he should be able to access the area.

Further, obtaining access rights to the area (e.g., updating the individual's access rights so that the individual may access the area) can be a long and/or difficult process for the individual. For example, the individual may have to travel to a different location (e.g., control room, security desk, reception area, etc.) in the building, make a request to the relevant authority to grant the access, wait for the request to be approved, and have his or her identification card updated in order to obtain access.

Further, in situations where the access control device may not be working properly (e.g., the access control device is improperly granting or improperly denying access to the area), it may be difficult to determine why, or even whether, the device is not working. For example, a maintenance engineer of the access control system may not be able to discern why, or even whether, the access control device is not working by looking at the device.

DETAILED DESCRIPTION

Figure 1A:
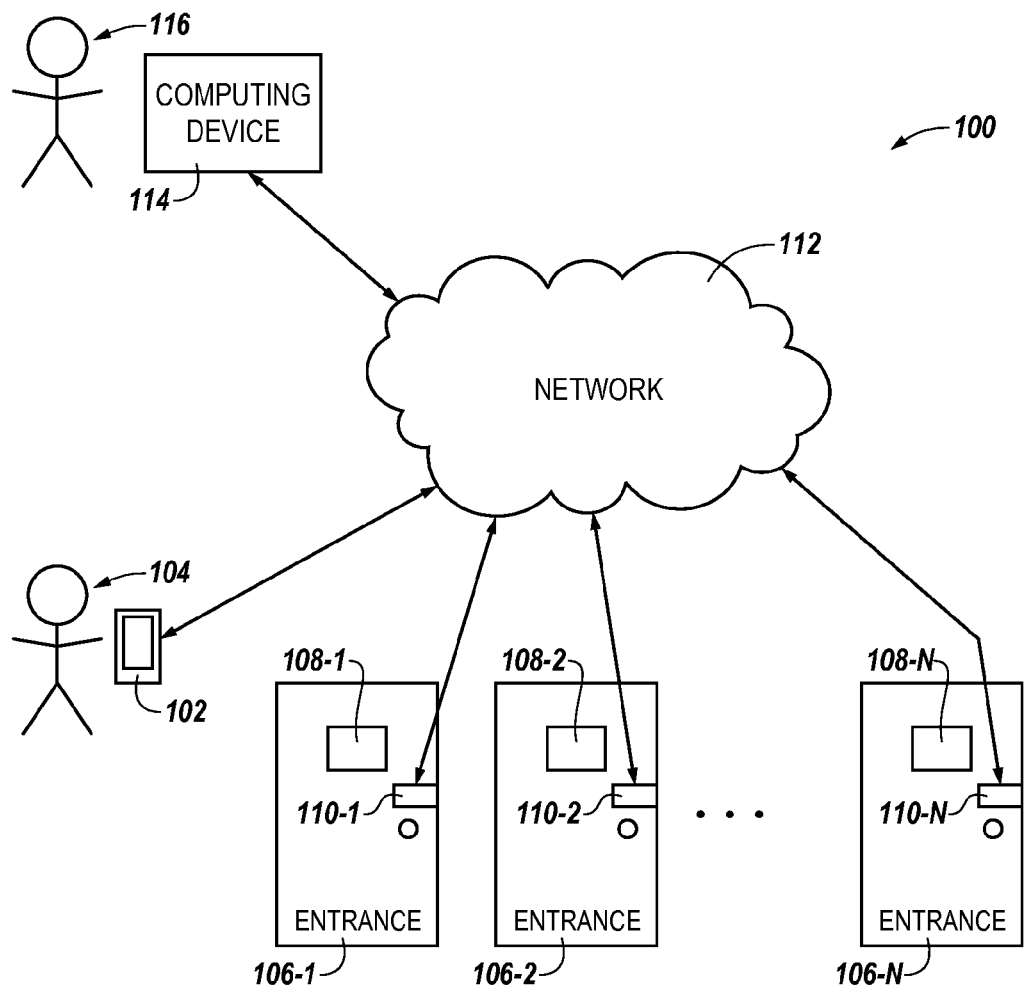
FIGS. 1A and 1B illustrate a system for managing access rights in accordance with one or more embodiments of the present disclosure.

Methods, devices, and systems for managing access rights are described herein. For example, one or more embodiments include receiving, by a mobile device, information from a passive tag located at an entrance to an area, wherein the information includes identification information for the entrance, sending, by the mobile device to a computing device of an access control system associated with the area, the information from the passive tag and a request to access the area, and granting, by the computing device of the access control system, access to the area based on the information from the passive tag and the request to access the area.

Managing access rights in accordance with embodiments of the present disclosure can solve the problems associated with previous access control systems. For example, if the access control system denies an individual access to an area, embodiments of the present disclosure can provide the individual with the reason(s) the access is being denied, and/or information about how the individual can obtain access to the area, such as actions the individual can take to obtain access. In contrast, previous access control systems may not be able to provide the individual with such information.

Further, embodiments of the present disclosure can make it easier and/or less time consuming for the individual to obtain access to the area as compared with previous approaches. For example, the individual may be able to quickly obtain access to the area at the entrance to the area. For instance, the individual can obtain access to the area without having to travel to another location(s) and/or get his or her identification card updated.

Further, in situations where the access control system may not be working properly (e.g., the system is improperly denying or improperly granting access to the area), embodiments of the present disclosure can make it easier and/or less time consuming to determine why, and/or whether, such a situation is occurring (e.g., why and/or whether the access control device at the entrance to the area is not working). For example, a maintenance engineer of the access control system may be able to quickly obtain the information needed to make such a determination at the entrance to the area (e.g., without having to travel to another location).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, As used herein, "a" or "a number of" something can refer to one or more such things. For example, "a number of entrances" can refer to one or more entrances. Additionally, the designator "N" as used herein, particularly with respect to reference numerals in the drawings, indicates that a number of the particular feature so designated can be included with embodiments of the present disclosure.

Figure 1B:
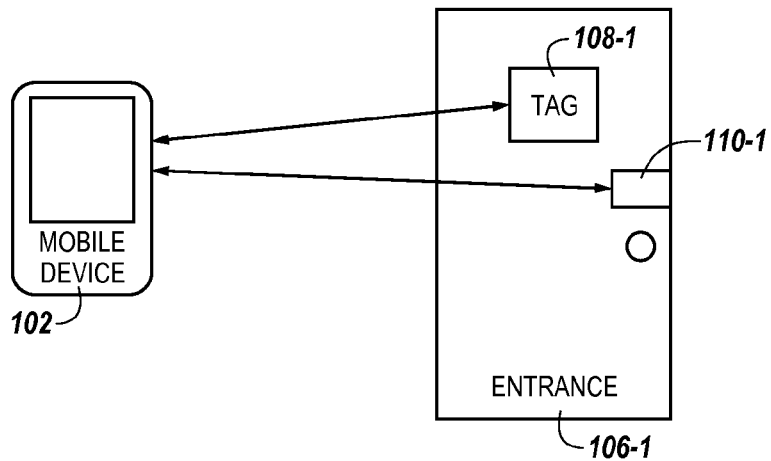

FIGS. 1A and 1B illustrate a system 100 for managing access rights in accordance with one or more embodiments of the present disclosure. System 100 can be used to manage access rights in, for example, a secured building or facility. For instance, system 100 can be part of an access control system that controls and/or monitors access to and/or within the building or facility (e.g., different areas of the building or facility).

As shown in FIGS. 1A and 1B, system 100 can include a number of access control devices 110-1, 110-2, . . . , 110-N. Each respective access control device can be located at an entrance 106-1, 106-2, . . . , 106-N to a different area of the building or facility (e.g., access control device 110-1 is located at entrance 106-1, access control device 110-2 is located at entrance 106-2, etc.), as illustrated in FIG. 1A. Entrances 106-1, 106-2, . . . , 106-N can be, for example, doors, and can be entrances to, for example, different rooms, zones, and/or hallways of the building or facility. However, embodiments of the present disclosure are not limited to a particular type of entrance or area.

Access control devices 110-1, 110-2, . . . , 110-N can control (e.g., limit and/or restrict) and/or monitor access to its respective area. For example, access control devices 110-1, 110-2, . . . , 110-N can be card readers and/or electronic locks, among other types of access control devices. However, embodiments of the present disclosure are not limited to a particular type(s) of access control device. An individual (e.g., a worker, visitor, employee, etc.) may gain access to (e.g., enter) the area controlled by a respective access control device by presenting a valid identification token (e.g., key card, magnetic badge, wireless identification tag, etc.) to that access control device.

As shown in FIGS. 1A and 1B, system 100 can include a number of passive tags 108-1, 108-2, . . . , 108-N. Each passive tag can be located at a different entrance 106-1, 106-2, . . . , 106-N (e.g., passive tag 108-1 is located at entrance 106-1, passive tag 108-2 is located at entrance 106-2, etc.), as illustrated in FIG. 1A.

In the example illustrated in FIGS. 1A and 1B, passive tags 108-1, 108-2, . . . , 108-N are separate from (e.g., located outside of) the access control device located at their respective entrance (e.g., passive tag 108-1 is separate from access control device 110-1, passive tag 108-2 is separate from access control device 110-2, etc.). However, embodiments of the present disclosure are not so limited. For example, in some embodiments, passive tags 108-1, 108-2, . . . , 108-N can be part of (e.g., located in) the access control device located at their respective entrance (e.g., passive tag 108-1 can be part of access control device 110-1, passive tag 108-2 can be part of access control device 110-2, etc.).

Passive tags 108-1, 108-2, . . . , 108-N can be radio-frequency identification (RFID) tags that are capable of receiving, and are entirely dependent on, high level radio frequency energy from a particular device (e.g., mobile device 102 illustrated in FIGS. 1A and 1B and further described herein) to provide power for the passive tag's operation. The passive tags can be limited to operation when the passive tag is in contact and/or near contact with the device. For example, the passive tag can be placed within an excitation field (e.g., radio frequency energy, etc.) of (e.g. provided by) the device, and the radio energy provided by the device can be utilized by the passive tag to provide power to the passive tag and communicate with the device, as will be further described herein.

Passive tags 108-1, 108-2, . . . , 108-N can be, for example, near field communication (NFC) tags and/or Bluetooth (e.g., BLE) tags. However, embodiments of the present disclosure are not limited to a particular type(s) of passive tag.

Passive tags 108-1, 108-2, . . . , 108-N can include (e.g., store) identification information for its respective entrance (e.g., information identifying its respective entrance). For example, passive tag 108-1 can include information identifying that it is located at entrance 106-1, passive tag 108-2 can include information identifying that it is located at entrance 106-2, etc. Further, passive tags 108-1, 108-2, . . . , 108-N can include diagnostic information associated with the operation of the access control device located at its respective entrance (e.g., passive tag 108-1 can include diagnostic information associated with the operation of access control device 110-1, passive tag 108-2 can include diagnostic information associated with the operation of access control device 110-2, etc.).

As shown in FIGS. 1A and 1B, system 100 can include a mobile device 102. Mobile device 102 can be, for example, a smart phone, a tablet, or a personal digital assistant (PDA), among other types of mobile devices, having RFID (e.g., NFC and/or Bluetooth) communication capabilities. The user 104 of mobile device 102 illustrated in FIG. 1A can be, for example, a worker, visitor, or employee of the building or facility.

Figure 3:
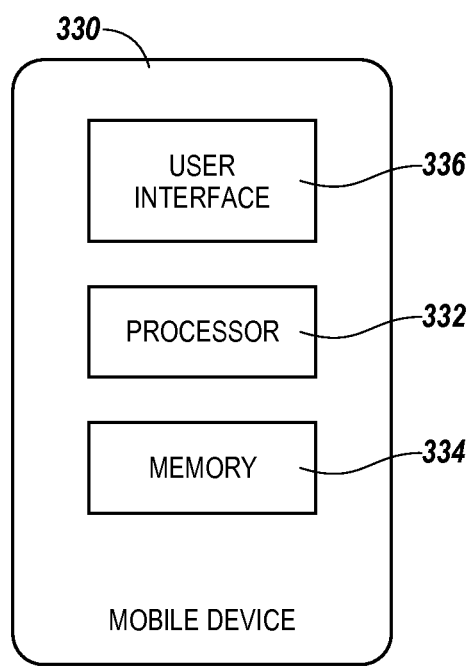
FIG. 3 illustrates a mobile device for managing access rights in accordance with one or more embodiments of the present disclosure.

Mobile device 102 will be further described herein (e.g., in connection with FIG. 3). For example, mobile device 102 can include a user interface, as will be further described herein (e.g., in connection with FIG. 3).

Mobile device 102 can receive information from passive tags 108-1, 108-2, . . . , 108-N. For instance, in the example illustrated in FIG. 1B, mobile device 102 is receiving information from passive tag 108-1. The received information can include the identification information for the respective entrance of the passive tag. For instance, in the example illustrated in FIG. 1B, the received information includes the identification information for entrance 106-1. Mobile device 102 can receive the information from the passive tag by, for example, scanning the passive tag.

In some embodiments, the user 104 of mobile device 102 can use mobile device 102 to receive the information (e.g., the identification information) from the passive tag if the user has been denied access to the respective area by the respective access control device (e.g., access control device 110-1 in the example illustrated in FIG. 1B). For example, if the access control device does not grant the user access to the respective area upon the user presenting his or her identification token to the device, and the user does not know the reason for the denial and/or believes he or she should have access to the area, the user may scan the passive tag with mobile device 102 to receive the information.

Mobile device 102 can determine, based on the information received from the passive tag (e.g., the information identifying the respective entrance), the reason(s) access to that area has been denied to the user, and provide to the user (e.g., display and/or or present on the user interface of the mobile device) the reason(s) access has been denied. For example, mobile device 102 can determine that access to that area has been denied because the user has not completed the requisite document(s) and/or undergone the requisite training needed to enter that area. In such an example, mobile device 102 (e.g., the user interface of the mobile device) can provide (e.g., display and/or present) the requisite documents needed to be completed by the user and/or the requisite training needed to be undergone by the user for access to the area to be granted to the user.

As shown in FIG. 1A, system 100 can include a computing device 114. Computing device 114 can be, for example, a laptop computer, desktop computer, or mobile device (e.g., smart phone, tablet, PDA, etc.), among other types of computing devices. The user 116 of computing device 114 illustrated in FIG. 1A can be, for example, an operator or manager of the access control system of the building or facility.

Computing device 114 can be coupled to (e.g., communicate with) mobile device 102 and access control devices 110-1, 110-2, . . . , 110-N via network 112, as illustrated in FIG. 1A and will be further described herein. Network 112 can be a wired or wireless network of the access control system, such as, for instance, a wide area network (WAN) such as the Internet, a local area network (LAN), a personal area network (PAN), a campus area network (CAN), or metropolitan area network (MAN), among other types of networks.

As used herein, a "network" (e.g., network 112) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 112 can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Mobile device 102 can send (e.g., transmit) the information (e.g., the identification information) received from the passive tag (e.g., passive tag 108-1), and a request to access the respective area from user 104, to computing device 114 via network 112. That is, computing device 114 can receive the information from the passive tag, and the access request, from mobile device 102 via network 112. In some embodiments, mobile device 102 can encrypt the information from the passive tag and/or the access request before sending them to computing device 114 (e.g., the information from the passive tag and/or the access request can be sent to computing device 114 in an encrypted communication). The access request can include, for example, identification information for (e.g., information identifying) mobile device 102 (e.g., identification information for user 104) and/or a reason for the request (e.g., the reason user 104 is requesting access to the respective area).

Upon receiving the information from the passive tag and the request to access the respective area from mobile device 102, computing device 114 (e.g., user 116 of computing device 114) can determine whether to grant user 104 access to the area based on the information from the passive tag and the access request (e.g., the identification information and/or reason included in the access request). Upon determining to grant user 104 access to the area, computing device 114 can grant the access to the area. Upon determining to not grant user 104 access to the area, computing device 114 can send, via network 112, a reason(s) access to the area has been denied. That is, computing device 114 (e.g., user 116) can grant, or not grant, user 104 access to the area based on the information from the passive tag and the access request. Further, in examples in which access to the area was denied because user 104 had not completed the requisite document(s) and/or undergone the requisite training needed to enter the area, computing device 114 can grant user 104 access to the area upon verifying that user 104 completed the requisite documents and/or training.

Computing device 114 can grant user 104 access to the area by, for example, sending an instruction (e.g., code) to grant the access directly to the respective access control device (e.g., access control device 110-1) via network 112, as illustrated in FIG. 1A. Additionally and/or alternatively, computing device 114 can grant user 104 access to the area by sending the instruction to grant the access to mobile device 102, and mobile device 102 send the instruction to the respective access control device (e.g., via RFID communication), as illustrated in FIGS. 1A and 1B. Upon receiving the instruction from computing device 114 and/or mobile device 102, the access control device can open the entrance (e.g., entrance 106-1) and allow user 104 to enter the area.

In some embodiments, computing device 114 can grant user 104 access to the area for a particular duration. For example, computing device 114 can grant user 104 access to the area for a shorter duration to allow the user one-time access to the area, or computing device 114 can grant user 104 access to the area for a longer duration to allow for repeated access to the area (e.g., to allow the user to access the area on multiple occasions). The duration of the access can depend on, for example, the information from the passive tag and the access request.

In some embodiments, the access request from user 104 can include a request to access a number of additional (e.g., related, nearby, and/or adjacent) areas. For instance, in the example illustrated in FIG. 1A, user 104 may request access to the area of entrance 106-2 in addition to the area of entrance 106-1. In such embodiments, computing device 114 can grant, or not grant, user 104 access to the additional area(s) based on the information from the passive tag and the request to access the number of additional areas. That is, user 104 may be able to receive access to the additional area without having to scan the access control device for the additional area and/or separately request access to the additional area at the entrance to the additional area.

Figure 2A:
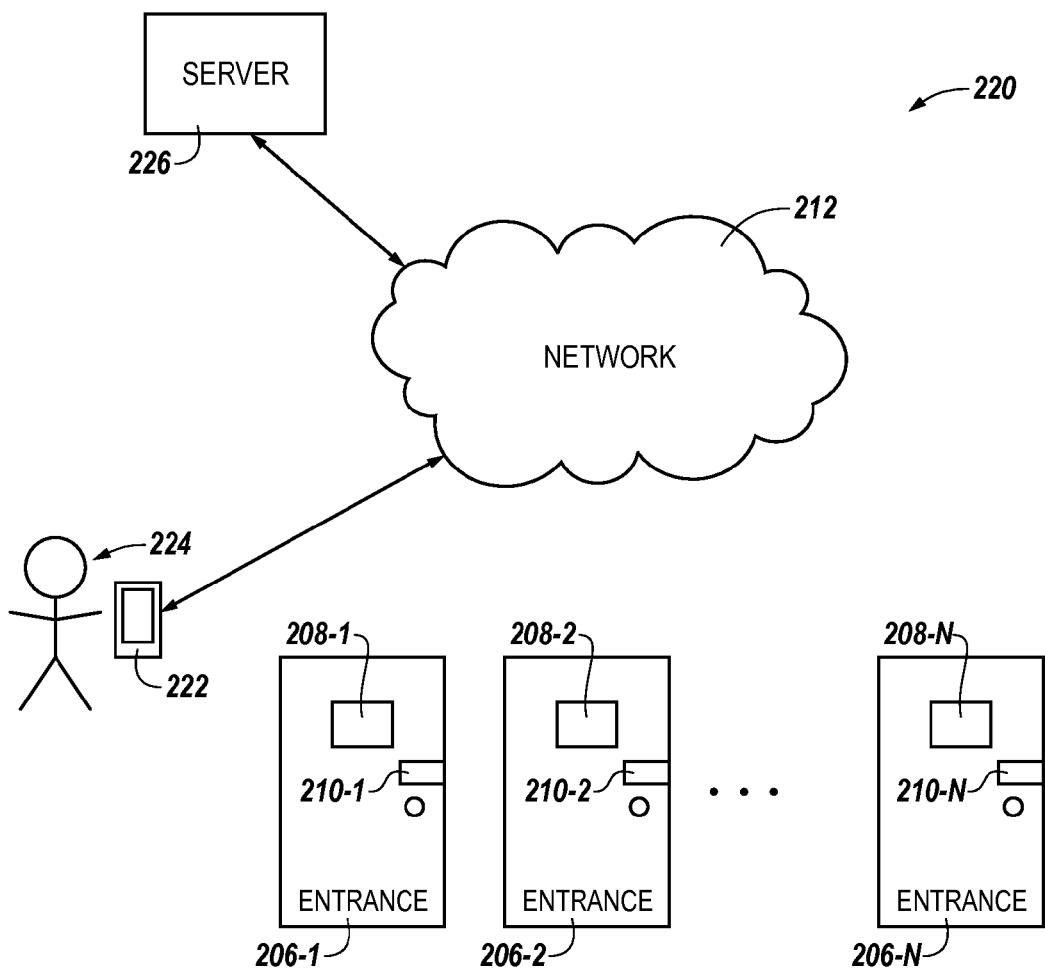
FIGS. 2A and 2B illustrate a system for managing access rights in accordance with one or more embodiments of the present disclosure.
Figure 2B:
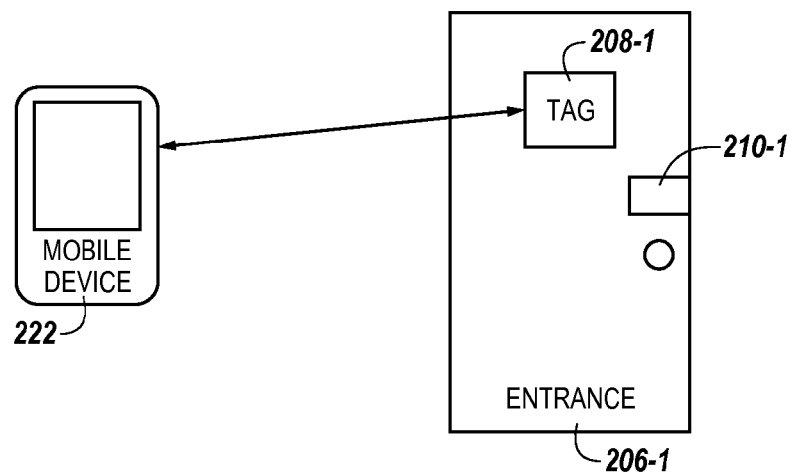

FIGS. 2A and 2B illustrate a system 220 for managing access rights in accordance with one or more embodiments of the present disclosure. System 220 can be used to manage access rights in (e.g., part of an access control system of), for example, a secured building or facility, such as the secured building or facility previously described in connection with FIGS. 1A and 1B.

As shown in FIGS. 2A and 2B, system 220 can include a number of access control devices 210-1, 210-2, . . . , 210-N and passive tags 208-1, 208-2, . . . , 208-N located at entrances 206-1, 206-2, . . . , 206-N in a manner analogous to that previously described in connection with FIGS. 1A and 1B. That is, access control devices 210-1, 210-2, . . . , 210-N, passive tags 208-1, 208-2, . . . , 208-N, and entrances 206-1, 206-2, . . . , 206-N can be analogous to access control devices 110-1, 110-2, . . . , 110-N, passive tags 108-1, 108-2, . . . , 108-N, and at entrances 106-1, 106-2, . . . , 106-N, respectively, previously described in connection with FIGS. 1A and 1B.

As shown in FIGS. 2A and 2B, system 220 can include a mobile device 222. Mobile device 222 can be, for example, a smart phone, a tablet, or a personal digital assistant (PDA), among other types of mobile devices, having RFID (e.g., NFC and/or Bluetooth) communication capabilities. The user 224 of mobile device 222 illustrated in FIG. 2A can be, for example, a maintenance person (e.g., a maintenance engineer) of the building or facility.

Mobile device 222 will be further described herein (e.g., in connection with FIG. 3). For example, mobile device 222 can include a user interface, as will be further described herein (e.g., in connection with FIG. 3).

Mobile device 222 can receive information from passive tags 208-1, 208-2, . . . , 208-N. For instance, in the example illustrated in FIG. 2B, mobile device 222 is receiving information from passive tag 208-1. The received information can include the diagnostic information associated with the operation of the access control device located at its respective entrance. For instance, in the example illustrated in FIG. 1B, the received information includes the diagnostic information associated with the operation of access control device 210-1. Mobile device 222 can receive the information from the passive tag by, for example, scanning the passive tag.

In some embodiments, the user 224 of mobile device 222 can use mobile device 222 to receive the information (e.g., the diagnostic information) from the passive tag if the respective access control device (e.g., access control device 210-1) appears to not be working properly (e.g., the access control device is improperly granting or improperly denying access to the area), and the user 224 needs to determine why, or even whether, the device is not working. Mobile device 222 (e.g., the user interface of the mobile device) can provide (e.g., display and/or present) the diagnostic information to user 224, and/or mobile device 222 (e.g., user 224) can diagnose a problem associated with the access control device based on the diagnostic information.

For example, as illustrated in FIG. 2A, mobile device 222 can retrieve, via network 212, existing information about the access control device (which can be identified using the identification information from the passive tag) from server 226 of the access control system. Network 212 can be, for example, network 112 previously described in connection with FIG. 1. Mobile device 222 can then compare and/or collate the retrieved information with the diagnostic information to diagnose the problem associated with the access control device.

FIG. 3 illustrates a mobile device 330 for managing access rights in accordance with one or more embodiments of the present disclosure. Mobile device 330 can be, for example, mobile device 102 and/or mobile device 222 (e.g., the mobile device of user 104 and/or user 224) previously described in connection with FIGS. 1 and 2, respectively.

As shown in FIG. 3, mobile device 330 includes a memory 334 and a processor 332. Memory 334 can be any type of storage medium that can be accessed by processor 332 to perform various examples of the present disclosure. For example, memory 334 can be a non-transitory computer readable medium having computer readable instructions (e.g., computer program instructions) stored thereon that are executable by processor 332 to perform various examples of the present disclosure. That is, processor 332 can execute the executable instructions stored in memory 334 to perform various examples of the present disclosure.

Memory 334 can be volatile or nonvolatile memory. Memory 334 can also be removable (e.g., portable) memory, or non-removable (e.g., internal) memory. For example, memory 334 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 334 is illustrated as being located in mobile device 330, embodiments of the present disclosure are not so limited. For example, memory 334 can also be located internal to another computing resource (e.g., enabling computer readable instructions to be downloaded over the Internet or another wired or wireless connection).

As shown in FIG. 3, mobile device 330 includes a user interface 336. The user of mobile device 330 (e.g., users 104 and/or 224) can interact with mobile device 330 via user interface 336. For example, user interface 336 can provide (e.g., display and/or present) information to the user of mobile device 330, and/or receive information from the user of mobile device 330. For instance, in some embodiments, user interface 336 can be a graphical user interface (GUI) that can include a display (e.g., a screen) that can provide and/or receive information to and/or from the user of mobile device 330. The display can be, for instance, a touch-screen (e.g., the GUI can include touch-screen capabilities). Embodiments of the present disclosure, however, are not limited to a particular type(s) of user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for managing access rights, comprising:
   receiving, by a mobile device, information from a passive tag located at an entrance to an area, wherein the information includes identification information for the entrance;
   sending, by the mobile device to a computing device of an access control system associated with the area, the information from the passive tag and a request to access the area;

granting, by the computing device of the access control system, access to the area based on the information from the passive tag and the request to access the area; and determining, by a processor of the mobile device, a reason access to the area has been denied based on the information from the passive tag received by the mobile device.

2. The method of claim 1, wherein granting the access to the area includes sending, by the computing device of the access control system, an instruction to grant the access directly to an access control device at the entrance.

3. The method of claim 1, wherein granting the access to the area includes:

sending, by the computing device of the access control system, an instruction to grant the access to the mobile device; and sending, by the mobile device, the instruction to grant the access to an access control device at the entrance.

4. The method of claim 1, wherein the request to access the area includes:

identification information for the mobile device; and a reason for the request.

5. The method of claim 1, wherein the method includes:

providing, by the mobile device to a user of the mobile device, a number of documents to be completed by the user for access to the area to be granted; and granting, by the computing device of the access control system, access to the area upon completion of the number of documents by the user.

6. The method of claim 1, wherein the method includes:

providing, by the mobile device to a user of the mobile device, training to be undergone by the user for access to the area to be granted; and granting, by the computing device of the access control system, access to the area upon completion of the training by the user.

7. The method of claim 1, wherein the method includes sending the information from the passive tag and the request to access the area to the computing device of the access control system via a network of the access control system.

8. A mobile device for managing access rights, comprising:

a user interface;

a memory; and a processor configured to execute executable instructions stored in the memory to:

receive information from a passive tag located at an entrance to an area, wherein the information includes identification information for the entrance;

send, to a computing device of an access control system associated with the area, the information from the passive tag and a request to access the area;

receive, from the computing device of the access control system, an instruction to grant access to the area;

send, to an access control device at the entrance, the instruction to grant access to the area;

determine, based on the information from the passive tag received by the processor of the mobile device, a reason access to the area has been denied; and display, on the user interface, the reason access to the area has been denied.

9. The mobile device of claim 8, wherein:

the information from the passive tag includes diagnostic information associated with operation of an access control device at the entrance; and the processor is configured to execute the instructions to display, on the user interface, the diagnostic information.

10. A system for managing access rights, comprising:

a passive tag located at an entrance to an area, wherein the passive tag includes identification information for the entrance;

a mobile device configured to:

receive the identification information from the passive tag; and determine, based on the identification information received from the passive tag, a reason access to the area has been denied; and a computing device of an access control system associated with the area, wherein the computing device is configured to:

receive, from the mobile device, the identification information from the passive tag and a request to access the area; and grant access to the area based on the identification information from the passive tag and the request to access the area.

11. The system of claim 10, wherein:

the passive tag includes diagnostic information associated with operation of an access control device at the entrance; and the mobile device is configured to:

receive the diagnostic information from the passive tag; and diagnose a problem associated with the access control device based on the diagnostic information.

12. The system of claim 10, wherein the computing device of the access control system is configured to grant the access to the area for a particular duration.

13. The system of claim 10, wherein:

the request to access the area includes a request to access a number of additional areas; and the computing device of the access control system is configured to grant access to the number of additional areas based on the identification information from the passive tag and the request to access the number of additional areas.

14. The system of claim 10, wherein the passive tag is separate from an access control device at the entrance.

15. The system of claim 10, wherein the passive tag is part of an access control device at the entrance.

16. The system of claim 10, wherein the passive tag is a near field communication tag or a Bluetooth tag.

17. The system of claim 10, wherein the mobile device is configured to receive the identification information from the passive tag by scanning the passive tag.

\* \* \* \* \*